United States Patent Office.

JULIUS ENGELKE, OF CINCINNATI, OHIO.

ANTISEPTIC COMPOSITION FOR TREATING LEATHER.

SPECIFICATION forming part of Letters Patent No. 448,420, dated March 17, 1891.

Application filed August 19, 1890. Serial No. 362,436. (No specimens.)

*To all whom it may concern:*

Be it known that I, JULIUS ENGELKE, a citizen of the United States, residing at Cincinnati, in the county of Hamilton and State of Ohio, have invented a certain new and useful Antiseptic Tanning Composition; and I do declare the following to be a full, clear, and exact description of the invention, such as will enable others skilled in the art to which it appertains to make and use the same.

This invention relates to an antiseptic tanning composition for hides or leather, intended to be used as lining for horse-collars, all kinds of harness-pads, and similar appliances. To make such hides more appropriate for this particular purpose, the natural hair thereon is not removed, because resting with it next to the skin of the animal they form a soft bolster, are cool because this hairy layer permits free evaporation and escape of the perspiration, keep as a consequence the harness dry, and protect it against mold and rot, and, finally, by their softness prevent the start of sores on the animal. To tan and prepare hides for such linings, so as to keep them from rotting by constant contact with the moisture of the perspiration, to make them tough and pliable at the same time, to preserve the roots of the hair in a manner to prevent it from falling out, to render them harmless and salubrious by proper medical and antiseptic treatment, and to keep moths and other insects out have been fraught with many difficulties. In the first place, all fatty substances which might tend to cause fermentation and rot must be eradicated; secondly, to make and keep the leather pliable and to prevent the perspiration of the animal from entering and saturating the same, setting up fermentation, and causing rot, its pores must be filled with an unctuous and preserving substance; thirdly, the pores of the hide, including those containing the roots of the hair, should be contracted to toughen the leather, and also to guard against all possibilities of any of the hair falling out, and, fourthly, the odor caused and remaining from the tanning process should be eliminated. Finally, the means selected to comply with all of these conditions must be of a character as to be not only harmless to the skin of the animal, but in addition to that they should have such medical and antiseptic qualities as to prevent sores to start, to heal them, and prevent their spread in cases where they exist, and, finally, they should harden the skin in places where the pads are in constant contact and bear on it.

With reference to the aforesaid the object of my new tanning process is to impart to the leather all the qualities enumerated above. By practical experiment I have found that for the first condition corrosive sublimate is the most suitable means. It acts as an antiseptic and germicide by killing or neutralizing all such matter which might cause rot and induce the start of fungi. For the second requirement I use phenol or the kindred preparations derived therefrom. It fills the pores of the hide, and by its unctuous properties keeps the same soft and pliable. The third condition is best complied with by the application of salicylic acid, which contracts the pores of the hide and toughens it. Those pores containing the roots of the hair are also contracted, preventing the falling out of the latter. The fourth condition is satisfied by menthol, which, by its penetrating odor, eliminates the scent of the tanning process adhering to the hide.

In cases where pads lined with leather so prepared come in contact with sores on the animal the corrosive sublimate, in combination with the phenol contained in the pores of the lining, will stop the spread of the sores, and by virtue of the antiseptical and germicidal properties of these drugs will heal the sores and prevent their recurrence. In addition to the named effects on the skin of the animal these drugs, in combination with the salicylic acid, will also harden the same. Hides and hair so saturated and prepared are fully germ and moth proof, because the drugs used in their treatment are inimical to insect life.

The above-described chemicals may be applied by adding them to the ordinary tanning-liquor prepared from sumac or bark, in which the hides are immersed, and in which case the procedure is the same as the usual tanning process, or they may be applied like a dressing by means of a brush after the ordinary tanning process has been gone through with. The temperature of the composition is preferably from 60° to 70° Fahrenheit. The menthol, in a solution of five parts of the former dissolved in ninety-five parts of alcohol, is best applied separately and lastly in form of a spray. As regards the proportions of said chemicals, I have found that one part of corrosive sublimate, eight parts of phenol, and one part of salicylic acid, all dissolved in sixty parts of water, produce the best results. The quantity of water may be varied, however, in order to produce a more or less concentrated solution, by the strength of which the duration of the tanning process may be lengthened or shortened. Equivalents may of course be substituted where they produce the same results. For instance, boracic acid might be used for the corrosive sublimate, and also for the salicylic acid. For the phenol any of its species may be installed.

Hides or leather so prepared preserve remarkably well, and are rendered exceedingly tough and tenacious without losing their pliability and softness.

The preparation, if mixed with the ordinary tanning-liquor, will hasten the whole tanning process and keep said liquor from getting sour or spoiled.

Having described my invention, I claim as new—

An antiseptic tanning composition applied as described, and consisting of one part of corrosive sublimate, eight parts of phenol, and one part of salicylic acid, all dissolved in sixty parts of water, substantially as described.

In testimony whereof I affix my signature in presence of two witnesses.

JULIUS ENGELKE.

Witnesses:
CARL SPENGEL.
JNO. M. SMEDES.